J. A. JACKSON.
CAR TRUCK CONSTRUCTION.
APPLICATION FILED JUNE 24, 1915.
1,174,936.
Patented Mar. 7, 1916.
3 SHEETS—SHEET 1.
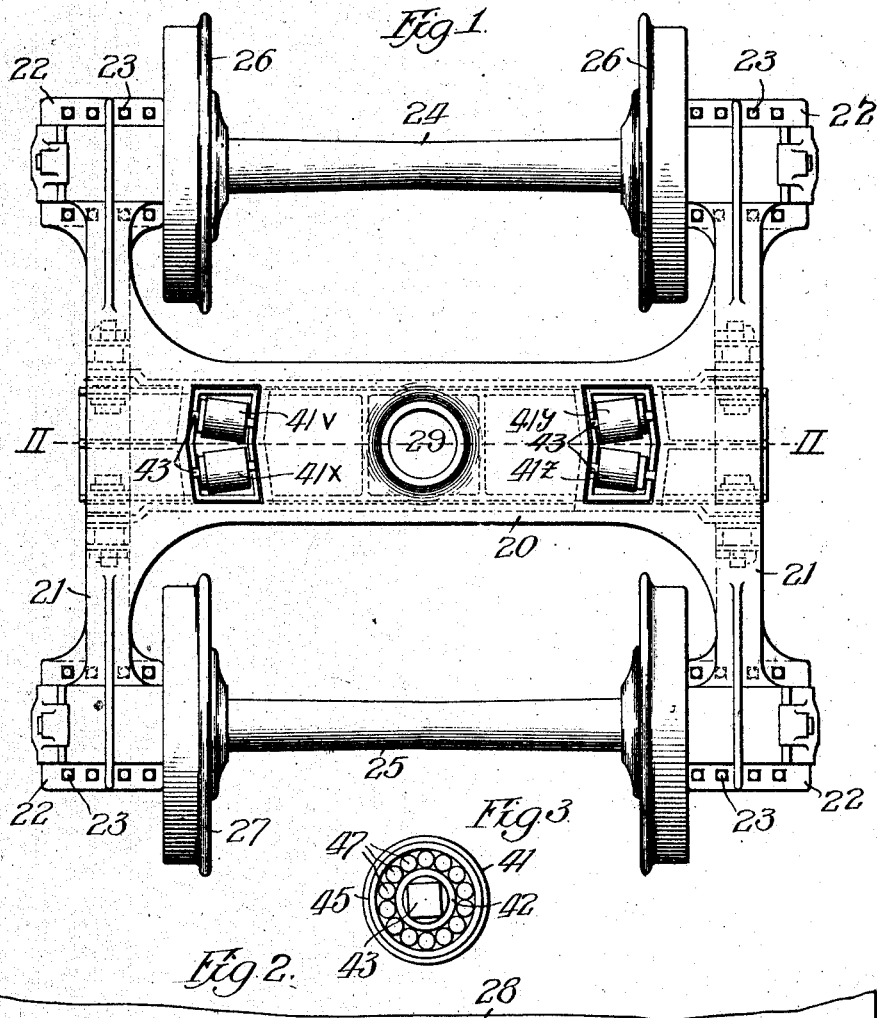
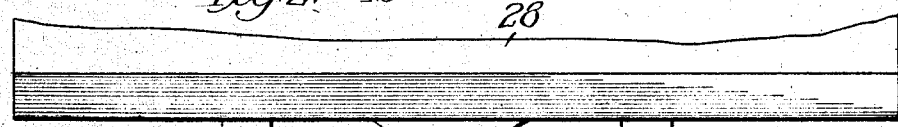

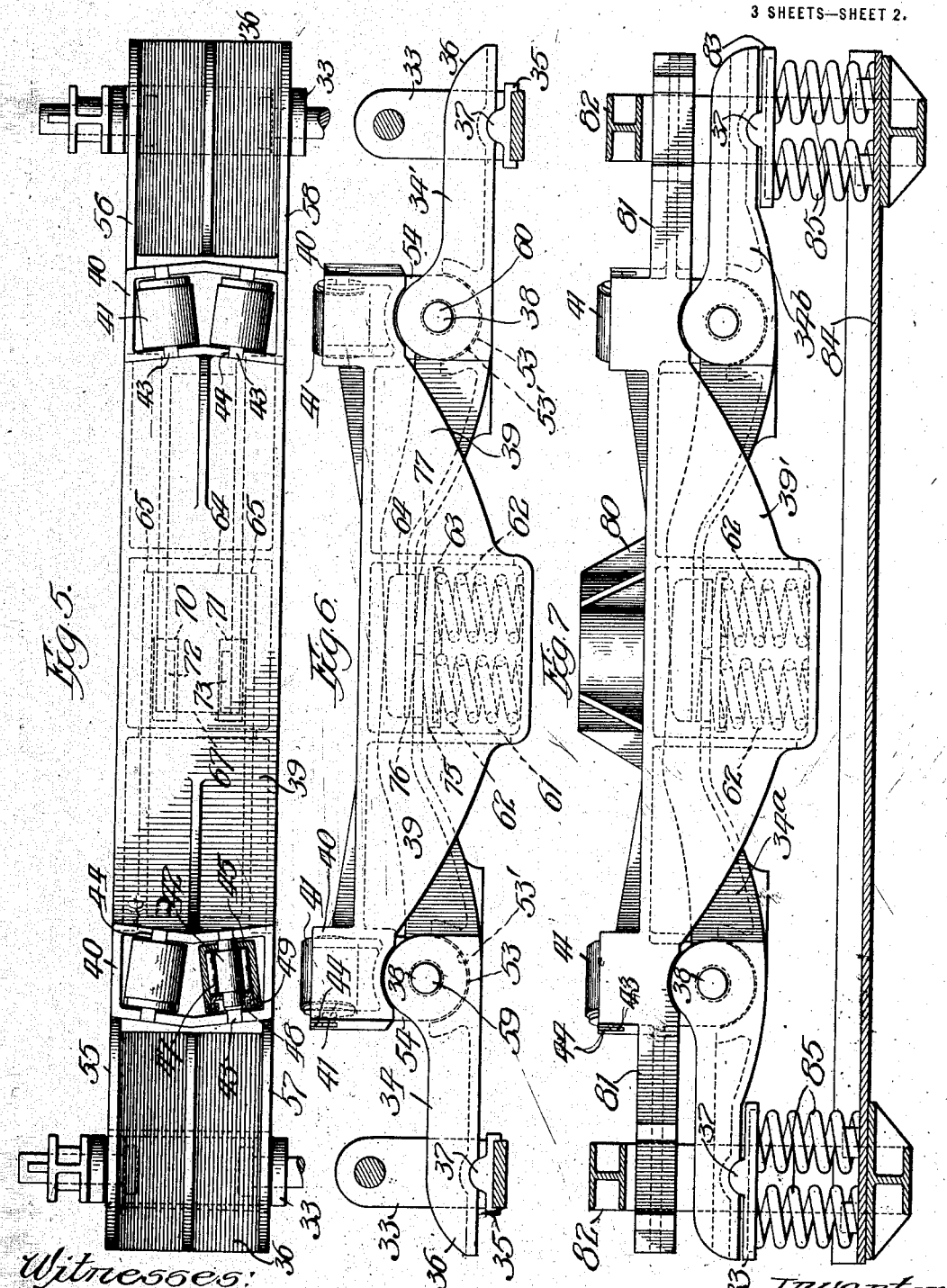

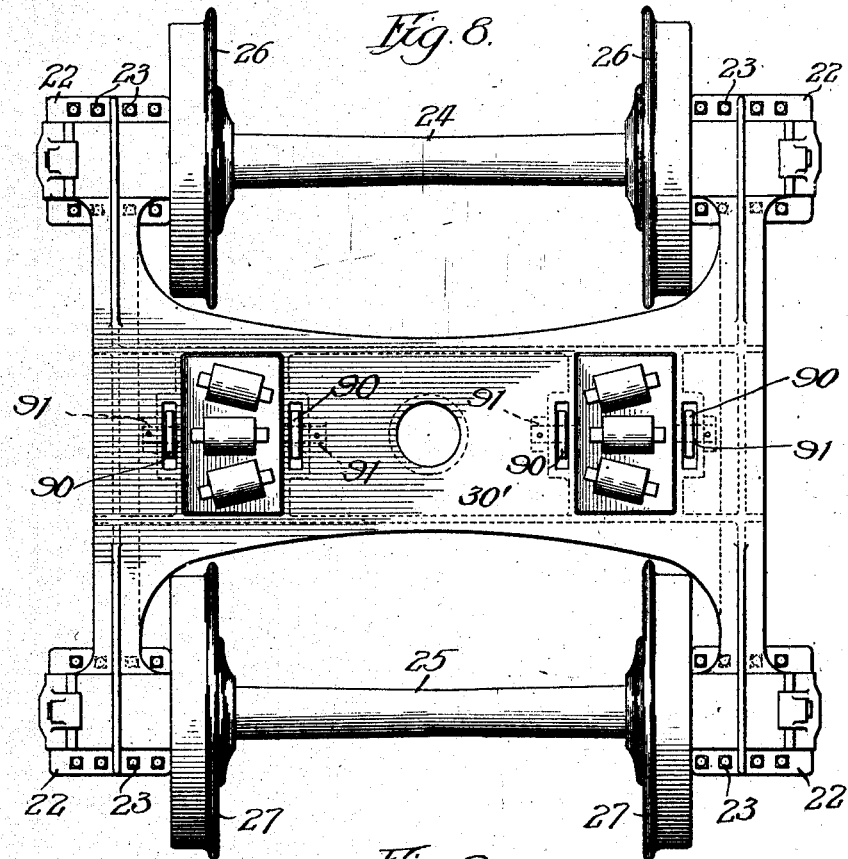
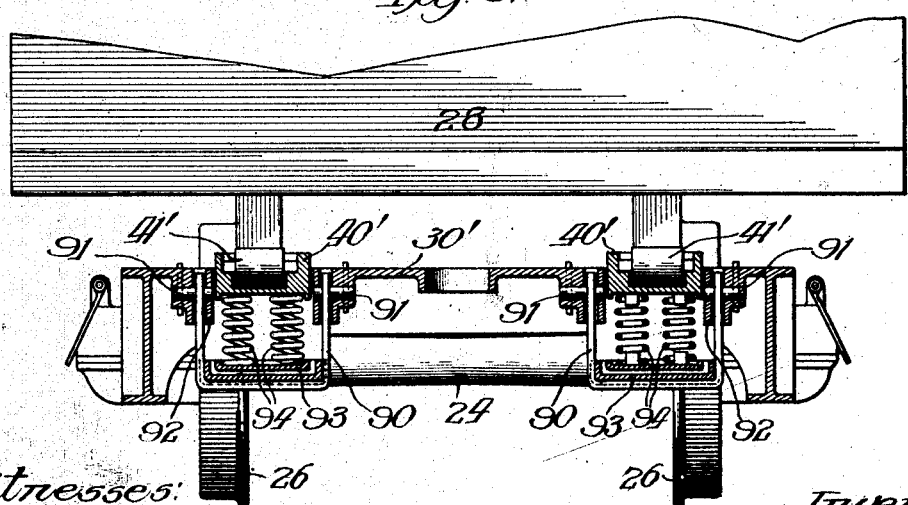

UNITED STATES PATENT OFFICE.

JOHN A. JACKSON, OF CHESTERTON, INDIANA, ASSIGNOR OF ONE-HALF TO CHRISTIAN DAVIDSON, OF CHICAGO, ILLINOIS.

CAR-TRUCK CONSTRUCTION.

1,174,936.  Specification of Letters Patent.  Patented Mar. 7, 1916.

Application filed June 24, 1915. Serial No. 35,992.

*To all whom it may concern:*

Be it known that I, JOHN A. JACKSON, a citizen of the United States, and a resident of Chesterton, in the State of Indiana, have invented certain new and useful Improvements in Car-Truck Construction, of which the following is a specification.

My present invention relates to railway car trucks in general and more particularly to car trucks embodying cast steel members and has particular reference to the provision of an improved type of truck employing a greatly reduced number of parts and one wherein the load may be carried more directly upon the truck side frame members rather than indirectly through a center bearing.

The principal objects of my present invention are the provision of an improved form of car truck construction wherein the side frame and transom are made integral whether or not a bolster is used, the provision of an approved construction characterized as above wherein journal boxes are made integral with the side frame members save for their lower halves which are divided from the main structure along the axes of the wheel centers; the provision of an approved structure of the class referred to wherein the load may be carried more directly upon opposite sides of the frame with a view to prevent "teetering" and to prevent warping of the truck both as an entirety, and relatively to the body and to the track; the provision of an improved form of side bearings adapted to operate under constant pressure, to allow the truck to swing freely on rounding curves, but to oppose resistance to any longitudinal movement of the body relatively to the truck when running on a straight track; the provision of an improved type of bolster useful in connection with said truck frame and said side bearing constructions, and one which will oppose a yielding resistance to and compensate for any tendency of the body to "teeter" relatively to the truck.

In attaining the objects stated, as well as certain other benefits and advantages to be below disclosed and overcoming certain objections including those above referred to, I have provided the constructions illustrated in the accompanying drawings, wherein—

Figure 1 is a plan view of a car truck embodying my improvements in preferred form, Fig. 2 is an elevational view partly in section taken on the line 2—2 of Fig. 1; Fig. 3 is a detailed elevational view of a preferred form of roller side bearing used with the device of Fig. 1; Fig. 4 is a sectional view of a modified form of side bearing; Figs. 5 and 6 are respectively plan and side elevational views of a preferred form of bolster forming part of the structures of Figs. 1 and 2; Fig. 7 is an elevational view of a modified form of bolster construction and Figs. 8 and 9 are respectively plan and elevational views of a modified form of truck construction.

Referring first more particularly to Figs. 1 and 2, it will be observed that I have here illustrated a construction wherein the transom 20, side frame members 21—21, and the upper halves 22—22 of the journal boxes are all cast integrally, the lower halves of the journal boxes being secured to the upper halves as indicated at 23, where I have shown bolts, the line of division between the journal box portions being preferably along the axes of the front and rear axles 24 and 25 on which the wheels 26—26 and 27—27 are mounted. On inspection of Fig. 2, it will be observed that the car body 28 has been illustrated diagrammatically and the transom 20 apertured as indicated at 29 for the center bearings, car side bearing members 30—30 which may be of any suitable and convenient type, being carried by such body. The transom 20 is provided at its outermost portions 31—31 with yokes 32—32 which I provide as supports for yokes 33—33 of the equalizing members 34—34' of the bolster (to be more particularly described in connection with Figs. 5 and 6) wearing plates 35—35 being interposed between the yokes 32 and the bolster ends 36, such ends and plates being spaced apart and rounded reciprocally as indicated at 37, to the end that the bolster members may oscillate upon such plates. The equalizing members 34 are pivotally mounted, as indicated at 38—38 in the main bolster member 39, which carries at its outer portions 40—40 boxes adapted to receive the truck side bearing members 41—41 with which the side bearing members 30—30 co-act, the transom 20 being apertured to allow the passage of such boxes therethrough.

Referring now more particularly to Figs. 3 and 4, wherein I have illustrated a preferred type of construction of the truck side bearing members 41, it will be observed that I here make use of a stationary cylindrical center 42 having at each end extensions 43 adapted to engage slots 44 in the boxes 40 and thus be held against rotation, an outer cylindrical shell or casing 45 with which the members 30 contact in use, a series of interposed rollers 47, and a retainer 48 suitably secured in position by bolts 49 by means of which the members are held in assembled relation, to the end that the casing 45 may rotate freely upon the cylindrical center, though it is obvious that there will be no movement of the bearing as a whole relatively to the truck. In Fig. 4 I have illustrated a slight modification of the shell 45, wherein instead of the smooth surface contacting with the members 30, the shell 50 is provided with teeth 51 engaging a rack 52 formed on such member 30, for purposes to be explained in connection with the operation of the device.

Referring now more particularly to Figs. 5 and 6, wherein I have illustrated the details of my preferred form of bolster construction it will be observed that the members 34—34' are provided with seats 53—53 adapted to receive extensions 53'—53' of the bolster member 39, and that the flanges 55, 56, and 57, 58 of the members 34—34' are apertured to receive pins 59 and 60 whereby the parts 34—34' are maintained in the pivotal and oscillatory relation to the member 39 indicated at 38, and at the same time are restrained from longitudinal movement relatively thereto in the event of undue wear or breakage of such pins 59 and 60 in service. For the purpose of maintaining the members 34—34' in proper relative relation to the member 39, absorbing shocks, and transmitting and equalizing any strain received by either of the members 34 to the other of such members, and thus at all times supporting the load substantially constantly and equally upon the bearings 41—41, I provide in the member 39 a box 61 wherein I mount as here shown a plurality of springs 62 with a flanged cap plate 63 upon which rests one end 64 of the member 34, flanged as indicated at 65 and 66, and between such flanges the end 67 of the member 34'. For the purpose of further preventing longitudinal movement between the members 34 and 34', the member 34 is provided with recesses as indicated at 70 and 71 to receive flanged extensions 72 and 73 of the member 34', and for the purpose of permitting free vertical movement between the members 63, 64 and 67, it will be observed that they are respectively slightly beveled as indicated at 75, 76, and 77.

Referring now more particularly to Fig. 7, wherein I have illustrated an adaptation of my improved bolster for service in connection with the well known diamond arch bar type of truck frame, it will be observed that I have here shown the center bearing 80 made integrally with the bolster member 39', that the said member 39' is provided with extensions 81—81 adapted to support the pedestal straps 82—82, and that the outer end of the members 34ª and 34ᵇ instead of being supported by the yoke 33 rest upon plates 83—83 between which and the spring plank 84 springs 85—85 are mounted, the construction otherwise being substantially that of Figs. 5 and 6.

On viewing Figs. 8 and 9 wherein I have illustrated a modified form of truck frame construction adapted for use without a truck bolster, it will be apparent that the construction here illustrated is similar to a certain extent to that of Figs. 1 and 2, and that in lieu of the bolster and coöperating yokes I make use of a single pair of yokes 90—90 supported by pins 91—91 in the transom 30', and that in extensions 92—92 of such transom I mount downwardly flanged blocks 40'—40' carrying side bearings 41'—41', interposing springs 94—94 between such blocks 40' and seats 93—93 provided in the said yokes.

From the foregoing description it will be perceived that while a center bearing is conveniently used with my improved form of truck construction, as indicated at 29 (Fig. 2), the load may be carried to such an extent as desired by the side bearings 21 through the contact of the members 30 therewith; that by virtue of the transom, side frame members, and journal boxes being cast integrally, a most rigid construction is attained, one wherein the several pairs of wheels with their respective axles are firmly maintained in proper relative position and yet the truck framing is readily demountable from such axles, and wherein there can be no appreciable distortion of the frame allowing the wheels on one side to tend to travel ahead of those on the opposite side; that by virtue of the angular arrangement of the side bearings relatively to each other as indicated at $41^v$, and $41^x$, and at $41^y$ and $41^z$, and on radii of the center bearing, the truck is at all times free to move pivotally relatively to the body on rounding a curve, but on the other hand in the event of any tendency toward longitudinal movement between the body and truck, such tendency will be overcome by the contact engagement between the members 30 and $41^v$ and $41^x$ and between the members 30' and $41^y$ and $41^z$; and that any strains received by either of the bolster members 34—34', are, by virtue of the springs 62 and the engagement of such members 34—34', transmitted and equalized in such a manner as to maintain the load substantially level and equally sustained by both side bearings. Other advantages of my invention will be obvious to those who are skilled in the art to which it pertains without further particularized specification.

Having thus described my invention and illustrated its use what I claim is new and desire to secure by Letters Patent is the following:

1. In a car truck, in combination with a pair of axles and wheels thereon, a framing comprising an integral transom, side frame members and journal boxes, separate journal box portions coacting therewith, means for connecting said last mentioned portions with said framing, and a pair of bolster members each having one end bearing on one of said side frame members and the other end bearing on a spring and means intermediate said ends for sustaining the car body.

2. In a car truck, in combination with a pair of axles and wheels thereon, side frame members, a connection therebetween, journal boxes, and a pair of bolster members each having one end bearing on one of said side frame members and the other end bearing on a spring and means intermediate said ends for sustaining the car body.

3. In a car truck, in combination with a pair of axles and wheels thereon, side frame members, a connection therebetween, and journal boxes, an equalizing bolster comprising relatively movable members bearing on said side frame members and adapted to sustain a car body.

4. In a car truck, in combination with a pair of axles and wheels thereon, side frame members, a connection therebetween, and journal boxes, an equalizing bolster bearing on said side frame members and provided between its ends with a plurality of side bearings adapted to sustain a car body.

5. In a car truck, in combination with a pair of axles and wheels thereon, side frame members, a connection therebetween, and journal boxes, an equalizing bolster bearing on said side frame members and provided between its ends with a plurality of sets of side bearings angularly disposed relatively to each other and adapted to sustain a car body.

6. In a car truck, in combination with a pair of axles and wheels thereon, a transom, a bolster member, and a car body having side bearing members thereon, a plurality of truck side bearings radially arranged with respect to the point about which the truck moves relatively to the car body carried by said bolster member fixed against longitudinal movement thereon, but adapted to move substantially vertically relatively to the transom, and contacting with said side bearings adapted to continuously sustain the weight of said body, whereby canting of said truck side bearings relatively to said transom is prevented.

7. In a car truck, in combination with a pair of axles and wheels thereon, a transom, a bolster member and a car body having side bearing members thereon, truck side bearings carried by said bolster member on each side thereof, each comprising a member fixed against longitudinal movement relatively to said body, and a plurality of cylindrical members radially arranged with respect to the point about which the truck moves relatively to the car body adapted to rotate on said fixed member and contact with one of said car side bearings and adapted to move substantially vertically relatively to the transom.

8. In a car truck, in combination with a pair of axles and wheels thereon, a framing, and a car body having side bearing members thereon, a plurality of angularly disposed side bearings carried by each side of said framing, each comprising a member fixed against longitudinal movement relatively to said body, a cylindrical member adapted to rotate on said fixed member and contact with one of said car side bearings, and antifriction means inserted between said fixed and rotating members, whereby said framing is free for pivotal movement relatively to said body but restrained from longitudinal movement relatively thereto.

9. In a car truck, in combination with a pair of wheels and axles thereon, side frame members, a connection therebetween, and journal boxes, an equalizing bolster comprising a member adapted to sustain the weight of the car body, a plurality of equalizing members supporting said last mentioned member and movable relatively thereto, one of the ends of each of said equalizing members being supported by one of said side frame members the opposite end being supported by a yieldingly resistant device.

10. In a car truck, in combination with a pair of wheels and axles thereon, side frame members, a connection therebetween, and journal boxes, an equalizing bolster comprising a member adapted to sustain the weight of the car body, a plurality of equalizing members supporting said last mentioned member and movable relatively thereto, one of the ends of each of said equalizing members being supported by one of said side frame members and the opposite end interlocking and being supported by a plurality of springs, whereby strains sustained by either of said equalizing members are transmitted to the other thereof.

11. In a car truck, in combination with a pair of wheels and axles thereon, side frame members, a connection therebetween, and journal boxes, an equalizing bolster comprising a member adapted to sustain the weight of the car body, provided with a spring box, a plurality of equalizing members supporting said last mentioned member and movable relatively thereto, one of the ends of each of said equalizing members being supported by one of said side frame members and the opposite end interlocking and being supported by a plurality of springs arranged vertically in said box, whereby strains sustained by either of said equalizing members are transmitted to the other thereof.

In testimony whereof I have hereunto signed my name in the presence of the two subscribed witnesses.

JOHN A. JACKSON.

Witnesses:
WILLIAM GOLDBERGER,
DONALD C. WILLIAMS.